Patented Mar. 6, 1928.

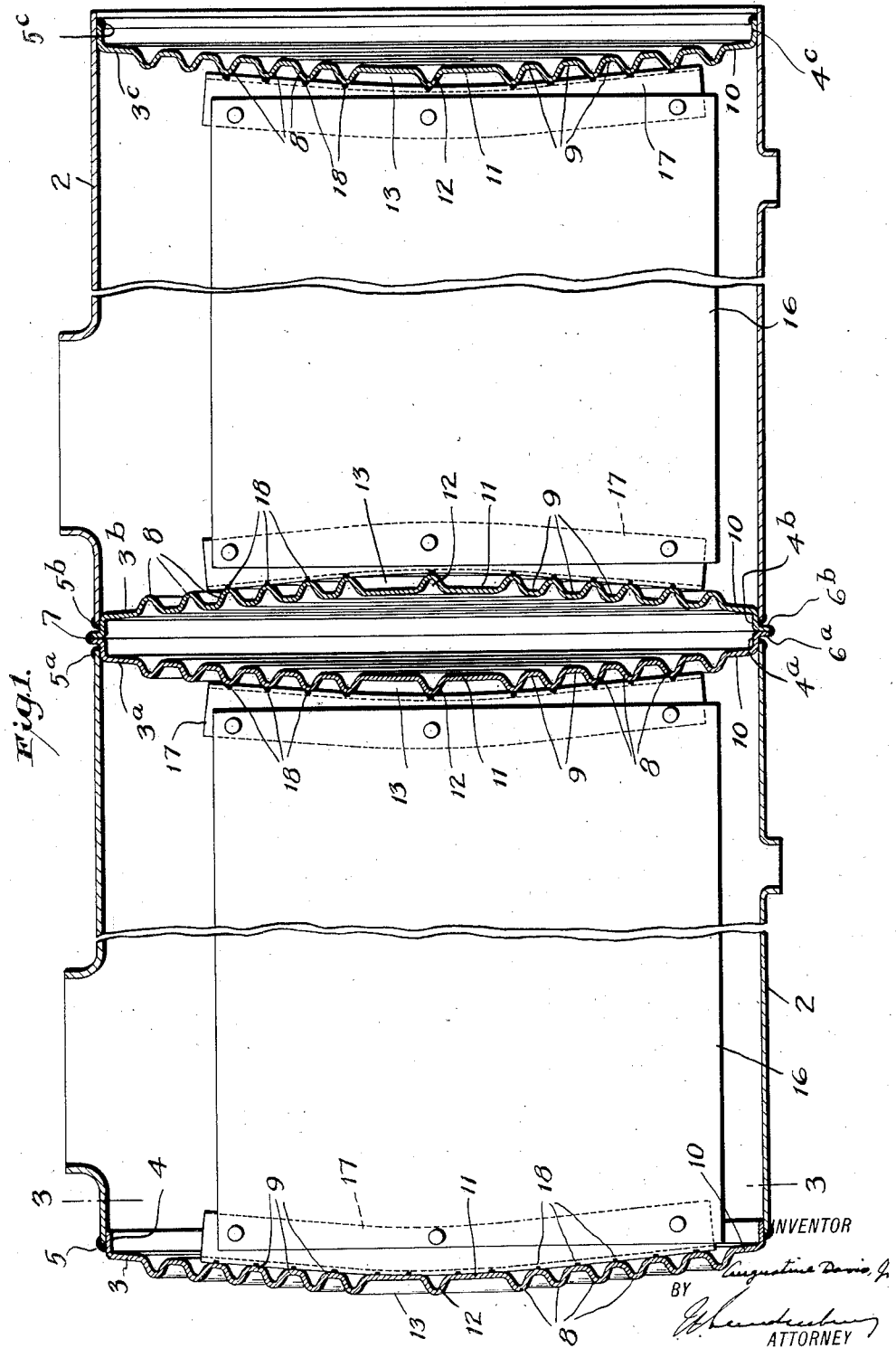

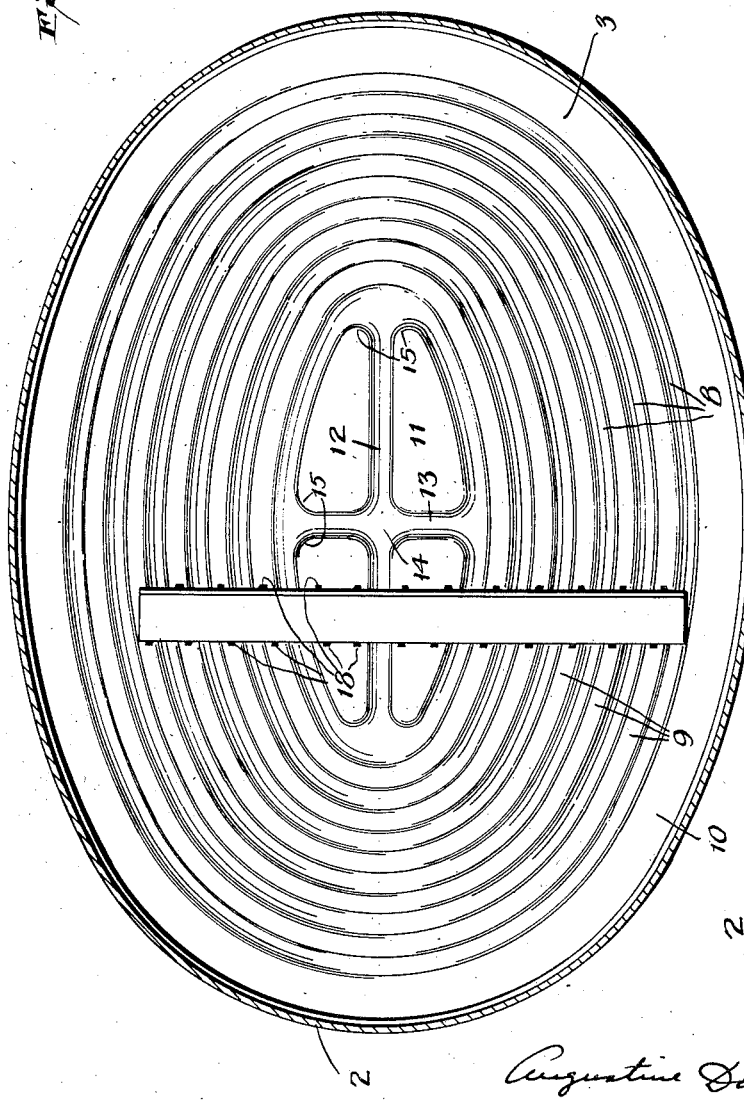

1,661,324

UNITED STATES PATENT OFFICE.

AUGUSTINE DAVIS, JR., OF COVINGTON, KENTUCKY.

VEHICLE TANK.

Application filed May 19, 1924. Serial No. 714,223.

The invention relates to tanks such as are used on tank trucks for transporting and making deliveries of gasoline both in cities and in rural districts. The object is more particularly to provide an improved reinforced construction for the tank heads, in order to obtain much greater strength and security for the tank as a whole in carrying these inflammable and surging loads over the irregularities of roads and pavements and against the shocks of possible collisions, to insure practically constant capacity in the tank compartments, to render unnecessary special supports to maintain the dish in the heads, to make possible a better and stronger anchorage of the internal surge plates to the heads, which also reinforces the heads, and to permit of a material reduction in weight.

In the accompanying drawings forming part hereof:

Fig. 1 is a longitudinal section through a two-compartment tank embodying the invention, intermediate portions of the shells being broken out;

Fig. 2 is a cross-section, showing an interior elevation of one of the heads with a surge-plate anchor thereon; and Fig. 3 is a horizontal section through a head and the adjoining portion of the shell, showing also a portion of the surge-plate.

The drawing illustrates a welded two-compartment truck tank of the type of construction covered by the Davis Patent No. 1,311,155, dated July 29, 1919. The horizontal sheet-metal shells 2, 2 are of elliptical cross-section, the major axis of the ellipse being horizontal, to lower the center of gravity. The ends of the tank and the division between the compartments are formed by sheet-metal heads 3, 3$^a$, 3$^b$, 3$^c$, having peripheral flanges for welding. The front head 3 is shown inserted into the forward shell with its flange 4 projecting inwardly of the shell, and is united with the shell by an oxyacetylene or electric weld 5 forming a peripheral fusion joint between the edge of the shell and the face of the flange. The rear head 3$^c$ may be inserted in the same manner; in case the tank is to have an attached bucket-box, however, as is common, it may be necessary to reverse the head, so that its flange 4$^c$ projects outward, and the rear head has been illustrated in this manner, the peripheral weld 5$^c$ being between the edge of the flange and the inner surface of the shell.

The intermediate heads 3$^a$, 3$^b$, in this particular type of construction, are set into the inner ends of the shells, with their flanges 4$^a$, 4$^b$ projecting toward each other, outwardly with respect to the shells as in the case of the rear head, in order that the out-turned lips 6$^a$, 6$^b$ of these flanges may be united by a peripheral edge weld 7 which unites the two sections of the tank in one structure. The welds uniting these heads to the shells are marked 5$^a$ and 5$^b$.

In welding a tank head into the shell, the progressive local heating and cooling of the region immediately adjacent the edge of the head, together with the gradual heating up of the entire head as the welder works around the seam, results in the setting up of unequal stresses in the sheet metal, and in the flat heads which have been employed, especially on the larger sizes, these stresses have produced an irregular buckling of the head, in addition to which there is a general dishing of the entire area of the head, due to the accumulated shrinkage produced around the perimeter resulting from the alternate intense heating and cooling of this entire perimeter. In those cases where the heads are set into the shell so that the dish is toward the interior of the compartment, as in the case of the heads marked 3$^a$, 3$^b$, 3$^c$ on the drawing, it has heretofore been necessary to provide a support to maintain the dish in the original form, as flat heads are easily reversed in dish, sometimes by merely filling the compartment with liquid, and, in any event by the surge of the contents. Furthermore, the pressure of the load, especially when its effect is constantly changing and greatly augmented in travel, causes such flat heads to buckle and change form in spots. The effect of these conditions is not only to cause the cubical capacity of the compartment to vary, but to introduce elements of uncertainty regarding the strength of the structure and its ability to withstand extra shock at a critical moment. Repeated local flexing is, of course, detrimental. There is at times a tendency for the anchorages of the surge plate on the heads to rupture, and, in general, the flat heads have not permitted these plates to act with full advantage as longitudinal braces, rather, at times, causing them to conflict with the effort of the heads to accommodate themselves to strain.

As to the thickness of the sheets of which the flat heads are made, it has been found necessary, particularly in the larger sizes, to use such heavy gauge that the tank bodies are considerably heavier than is desirable, representing an excessive amount of dead weight load which it has always been the aim of the oil companies to avoid.

I have accordingly sought to improve the tanks in these respects, through a construction of the head to give great strength and stiffness and substantially uniform deflection; the same means permitting also a more secure attachment for the surge plate. Tests with corrugated heads such as herein described have shown that they are not only effectively stiffer than heavier gauge flat heads, the difference in weight being approximately 22%, but that the lighter gauge heads, because of the flexibility of the material, will endure a greater stress than heavier gauge heads, the principle seemingly being that the heavier gauge metal, being less ductile, set up, under distortion greater stresses than the thinner material. The advantages of relatively light material are made possible by the structure forced upon the vertical heads.

Among various specific designs the construction illustrated has especially beneficial functions. It involves a set or series of substantially concentric, elliptical corrugations 8, of curved channel section, forced out of the original plane of the body of the head. This set of corrugations, together with intervening narrow flat areas 9, occupy the major part of the area of the head. Outside of the outermost corrugation, between it and the flange, is a flat, comparatively wide margin 10. The margin 10 and the narrower areas 9 between the corrugations represent the original plane of the sheet, the corrugations being forced therefrom in a direction away from the peripheral flange.

The corrugations 8 provide in effect a series of rings of reinforcement, which at all points are practically at right angles to the radial lines of the head, consequently resisting bending of the head along these lines. These elements, acting successively and collectively one within the other in diminishing zones, cause deflection to be uniform throughout the area of the head, avoiding the development of facets or troughs, on the one hand, and preventing local bulging on the other. The head thus acts as a unit to preserve symmetry, having sufficient slight come and go to save strain, and great ultimate stiffness against reversal of dish or destructive distortion.

In the central region of the head, however, concentric corrugations are not entirely satisfactory. I have accordingly omitted these corrugations in a considerable flat central area 11, and form in this area crossing corrugations 12, 13, preferably at right angles on the major and minor axes of the ellipse. The intersection of these long and short corrugations forms a central boss 14, and their flared ends 15 merge into the innermost concentric corrugation 8. This combination of corrugation elements has proved very efficient.

Longitudinal surge plates 16 are shown in the compartments, their opposite ends fastened to the heads, and their upper and lower edges spaced from the shell. The welding of these plates to the flat heads heretofore employed has presented some difficulty owing to the difference in expansion between the anchorages and the head during the welding operation, which threw unequal stress on the welds and caused buckling of the heads, and it was accordingly advisable to use small, separated anchorages at each end of the plate. The corrugated heads, however, have a give and take action in cooling, which overcomes this difficulty, and permits the advantageous employment of continuous vertical angle-iron anchors 17, substantially coextensive with the height of the surge plate, or of greater length. The ends of the surge plate are bolted to the projecting flanges of opposite anchors.

This anchor is welded, preferably by electric arc, along its edges, at 18, at spaced intervals, to the corrugations 8, 12, in the case of a dished-in head, or to the flat areas 9, 11 between the corrugations, in the case of a dished-out head. The continuous anchoring member, discontinuously welded to the corrugated head, provides a much more substantial anchorage for the surge plate than the separate welded anchorages used on the flat heads, and also adds considerable stiffness to the head itself. The anchor may be welded to the head before the latter is welded in the shell, the anchor bowing to some extent with the head as the latter assumes its dish. The bowing shown in the drawing may be considered to be exaggerated for purpose of illustration, the tendency of the anchors being to hold the heads flatter than they would be without such members. The corrugations of the head and the welding of the anchor thereto at intervals permits any flexing to take place without rupture. In some cases the heads may be dished by pressure before welding them to the shells.

While the preferred form of the invention has been described in detail, and is deemed the most beneficial, I wish it to be understood that I do not necessarily limit myself to the precise form since the advantages of the invention may be realized in more or less substantial manner with other embodiments.

What I claim as new is:

1. In a motor truck tank, the combination of a horizontal axis shell, a head having a peripheral flange, a weld joint uniting the flange to the shell, the body of the head being dished and being largely occupied by corrugations concentrically disposed within the flange, the central area of the head inside the innermost of the concentric corrugations containing crossing corrugations.

2. A motor truck tank head formed with a series of concentric corrugations, the central area within the innermost concentric corrugation containing crossing corrugations.

3. A motor truck tank head formed with a series of concentric corrugations, the central area within the innermost concentric corrugation containing crossing corrugations, the ends of which merge into the innermost concentric corrugation.

4. In a motor truck tank, an elliptical head containing a series of concentric corrugations, and crossing corrugations in the central ellipse disposed, respectively, on the major and minor axes.

5. A motor truck tank head having a peripheral flange and containing a system of concentric corrugations, with flat areas between the corrugations, and a flat margin between the flange and the outermost corrugation, the central area being flat and containing crossing corrugations.

6. In a motor truck tank having a horizontal axis shell and a longitudinal surge plate, the combination of a head having its body thrown into a system of corrugations, and a vertical anchor for the end of the surge plate welded at intervals to the corrugated body of the head.

7. In a motor truck tank, the combination of a horizontal axis shell, a head having a peripheral flange welded to the shell, the body of the head being corrugated, a surge plate, and a continuous vertical member which is welded to said corrugated body and to which the end of said surge plate is affixed.

8. In a motor truck tank, the combination of a horizontal axis shell, a head having a peripheral flange welded to the shell, the body of the head being corrugated, a surge plate, and an anchor for the surge plate welded to said corrugated body.

9. In a motor truck tank, the combination of a shell and a corrugated head therefor, of a reinforcing member welded at intervals to the corrugations of the head.

AUGUSTINE DAVIS, Jr.